United States Patent [19]

Lefebvre

[11] Patent Number: 5,078,009
[45] Date of Patent: Jan. 7, 1992

[54] TRANSIENT IMPELLER TEST FACILITY

[75] Inventor: Paul J. Lefebvre, Tiverton, R.I.

[73] Assignee: The United States of America as represented by the Secretary of the Navy, Washington, D.C.

[21] Appl. No.: 632,709

[22] Filed: Dec. 24, 1990

[51] Int. Cl.[5] .................. G01M 19/00; G01F 1/56
[52] U.S. Cl. ................................ 73/168; 73/861.08
[58] Field of Search ............ 73/168, 147, 861, 861.08

[56] References Cited

U.S. PATENT DOCUMENTS

| 2,924,971 | 2/1960 | Schroeder et al. | 73/168 |
| 3,942,375 | 3/1976 | Shepherd | 73/168 |
| 4,467,657 | 8/1984 | Olsson | 73/861 |
| 4,821,580 | 4/1989 | Jorritsma | 73/168 X |

OTHER PUBLICATIONS

"Journal of Fluids Engineering", Transactions of the ASME, Mar. 1990, vol. 112, pp. 13-15.

Primary Examiner—Daniel M. Yasich
Attorney, Agent, or Firm—Michael J. McGowan; Prithvi C. Lall; Michael F. Oglo

[57] ABSTRACT

A system is described for testing a pump or a turbine impeller under transient operating conditions in a fluid flow. The system provides simultaneously, as a function of time, user defined impeller speeds, fluid flow rate and rise in fluid pressure so as to simulate real conditions. This information can be used to analyze the performance of existing impellers or for designating new impellers.

4 Claims, 1 Drawing Sheet

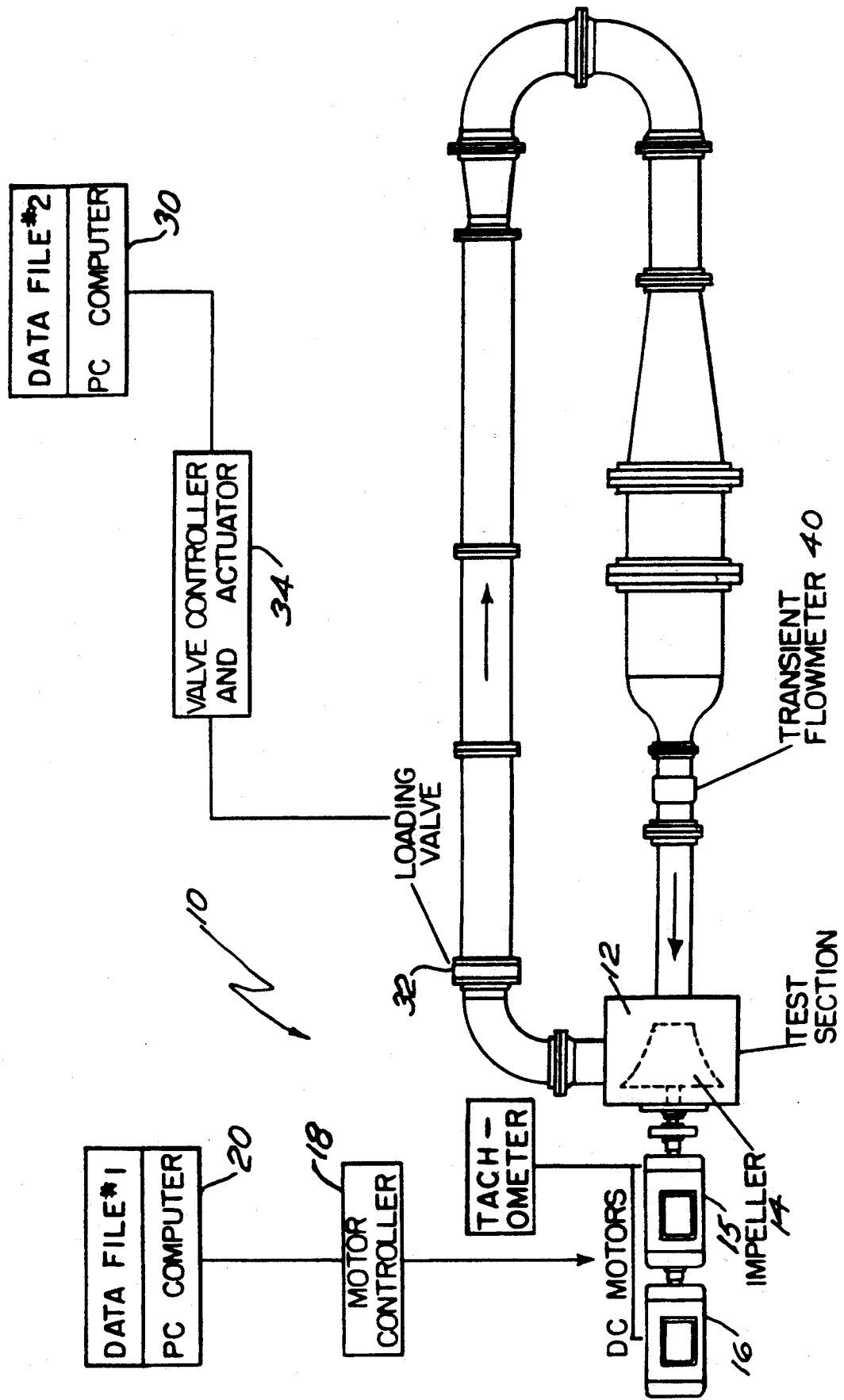

TRANSIENT IMPELLER TEST FACILITY

STATEMENT OF GOVERNMENT INTEREST

The invention described herein may be manufactured and used by or for the Government of the United States of America for governmental purposes without the payment of any royalties thereon or therefor.

Subject patent application is related to my two co-pending patent applications Ser. Nos. 07/632,872 and 07/632,708, each of filing date 24 Dec. 1990 and to another copending patent application by Paul J. Lefebvre and William W. Durgin, Ser. No. 07/632,707 and filing date 24 Dec. 1990 and which are also directed to various aspects of measurements of flow of fluids such as water.

BACKGROUND OF THE INVENTION (1) Field of the Invention

This invention generally relates to fluid flow measurements and more specifically to a system for testing turbine impellers under transient fluid flow conditions.

(2) Statement of the Prior Art

There are very few existing facilities which can operate a pump or turbine impeller under general and user defined transient conditions throughout the transient. Old facilities operated under either steady-state conditions or specific transient conditions with no provision for defining the desired conditions throughout the transient. Steady-state operation is defined here as when the impeller rotates at constant speed with constant flow rate and pressure rise. Transient operation is defined as when the impeller undergoes acceleration or deceleration (such as at pump start-up or shut down) and the impeller speed, flow rate and pressure rise all change with time.

There are many applications where impellers intentionally operate in a transient mode. However, to date, virtually all transient operation impeller designs are based on quasi steady assumptions and design approaches, i.e. they assume that at any instant in time during a transient, the impeller performance and flow field is identical to that which occurs during the corresponding operation at steady-state rotational speed.

To properly evaluate or eventually optimize a given impeller design, a facility to simulate actual conditions is desirable. Old steady-state facilities could not provide a means of accurately evaluating impeller performance under transient conditions. Old transient test facilities were limited in the type and number of different transient conditions which could be tested. It is thus desirable to have a test facility wherein the impeller speed and flow rate are user definable and controllable throughout the transient and the transient flow rate is accurately measurable.

SUMMARY OF THE INVENTION

The objects and advantages of the present invention are accomplished by using a transient impeller testing system according to the teachings of subject invention which includes low inertia D.C. motors with their speeds controlled by a computer having user defined parameters stored in a data file. The motors are directly compelled to an impeller under test. User defined flow rate conditions at the pump impeller are provided by a control valve controlled. A transient flowmeter is also used to accurately measure the fluid flow rate conditions.

An object of subject invention is to provide a system to test turbine impellers or the like under user defined fluid flow conditions.

Another object of subject invention is to generate user defined impeller speeds for testing the impeller at user defined transient fluid flow conditions.

Still another object of subject invention is to have user defined impeller speeds and fluid flow rate are stored in data files of a computer to control them simultaneously.

Other objects, advantages and novel features of the invention will become apparent from the following detailed description thereof when considered in conjunction with the accompanying single figure to illustrate a preferred embodiment.

DESCRIPTION OF THE PREFERRED EMBODIMENT

Referring now to the single figure there is shown a transient impeller testing system 10 according to the teachings of subject invention wherein the transient flowmeter 40 and the impeller 14 in the test area 12 are part of the pipe in which the fluid is flowing. It should be noted that the components used in this system are commercially available units or their equivalents except for the transient flowmeter which is described and claimed in co-pending patent application, Ser. No. 07/632,872, filed 24 December 1991 and which is incorporated here in by reference in its entirety. The system includes a test section 12 where an impeller 14 under test is housed. The impeller is directly coupled to D.C. motors 15 and 16 so that it rotates at the same speed as the motors. Motors 15 and 16 are D.C. low inertia 7 motors and their speed is measured by a commercially available tachometer which is a part of motors 15 and 16. The speed of the motors is controlled by motor controller 18 which gets its input from a data file of PC Computer 20. The motor speed is measured by a commercially available tachometer which is not shown and is a part of the motors. The transient fluid flow conditions are controlled by user determined conditions stored in data file of PC Computer 30. It should be noted that a single PC Computer can replace PC Computers 20 and 30. The user determined conditions control the loading valve 32 via valve control and actuator 34. Transient flowmeter 40 measures accurately the flow conditions which set up by the user determined conditions stored in data files of PC Computer 30. The transient flowmeter is described in my co-pending patent application, Ser. No. 07/632,872, filed 24 Dec. 1990. Thus this system provides user determined impeller speeds and fluid flow conditions stored in data files of computers 20 and 30.

Briefly stated, transient impeller testing system according to the teachings of subject invention provides means for varying the impeller speeds and the fluid conditions according to user determined conditions and methods of measuring speeds of the impeller by using tachometer and transient flow rate by transient flowmeter which forms part of the system.

From the foregoing description, one skilled in the art can easily ascertain the essential characteristics of this invention and without departing from the spirit and scope thereof, can make various changes and modifications of the invention to adapt it to various usages and conditions. It is therefore understood that within the scope of the appended claims the invention may be practiced otherwise than as specifically described.

What is claimed is:

1. A testing system for testing an impeller under transient operating conditions of a fluid flow in a pipe which comprises:

a testing area for housing said impeller and which is an integral part of said pipe;

motor means coupled to said impeller;

motor controller means coupled to said motor means for controlling speeds thereof;

a general purpose computer means having a first data file and a second data file, said first data file being used for storing and retrieving user-definable speeds of said motor means and of said impeller;

flowmeter means for measuring transient velocity of said fluid flow;

a load valve for controlling fluid flow in said pipe; and said general computer using said second data file for storing and retrieving user-definable transient in said fluid flow.

2. The impeller testing system of claim 1 wherein said motor means are directly coupled to said impeller so as to obtain the speeds of said impeller means.

3. The impeller testing system of claim 2 where said motor means includes a tachometer to measure the speed of said motor means.

4. The testing system of claim 3 wherein said motor means are low inertia D.C. motor means.